(12) United States Patent
Kubota

(10) Patent No.: US 11,566,683 B2
(45) Date of Patent: Jan. 31, 2023

(54) DAMPER DEVICE

(71) Applicant: AISIN CORPORATION, Kariya (JP)

(72) Inventor: Satoshi Kubota, Kariya (JP)

(73) Assignee: AISIN CORPORATION, Kariya (JP)

( * ) Notice: Subject to any disclaimer, the term of this patent is extended or adjusted under 35 U.S.C. 154(b) by 404 days.

(21) Appl. No.: 16/466,827

(22) PCT Filed: Nov. 17, 2017

(86) PCT No.: PCT/JP2017/041554
§ 371 (c)(1),
(2) Date: Jun. 5, 2019

(87) PCT Pub. No.: WO2018/110209
PCT Pub. Date: Jun. 21, 2018

(65) Prior Publication Data
US 2019/0323564 A1  Oct. 24, 2019

(30) Foreign Application Priority Data

Dec. 13, 2016 (JP) .............................. JP2016-241251

(51) Int. Cl.
*F16F 15/123* (2006.01)
*F16D 3/12* (2006.01)
(Continued)

(52) U.S. Cl.
CPC .......... *F16F 15/12333* (2013.01); *F16D 3/12* (2013.01); *F16F 1/12* (2013.01); *F16F 15/13453* (2013.01)

(58) Field of Classification Search
CPC . F16D 3/12; F16F 1/12; F16F 15/1232; F16F 15/12326; F16F 15/123333;
(Continued)

(56) References Cited

U.S. PATENT DOCUMENTS 4,351,168 A * 9/1982 Prince ............... F16F 15/12326
464/68.92
5,042,632 A   8/1991 Jäckel
(Continued)

FOREIGN PATENT DOCUMENTS

DE   39 09 892 A1    10/1989
DE   4007256 A1 *  9/1990  ........ F16F 15/13446
(Continued)

OTHER PUBLICATIONS

International Search Report (PCT/ISA/210) dated Jan. 9, 2018, by the Japan Patent Office as the International Searching Authority for International Application No. PCT/JP2017/041554.
(Continued)

*Primary Examiner* — Josh Skroupa
(74) *Attorney, Agent, or Firm* — Buchanan Ingersoll & Rooney PC

(57) ABSTRACT

A damper device includes first to third rotating elements rotatable about a rotational center; a first elastic element located between the first and third rotational elements and compressed by relative rotation of the first rotational element to the third rotational element in one rotational direction; a second elastic element located between the second and third rotational elements and compressed by relative rotation of the third rotational element to the second rotational element in the one rotational direction, a support member intervenient between the third rotational element and the first elastic element to support the first elastic element; and a restrictor provided with the third rotational element to rotatably support the support member in a plane orthogonal to the rotational center, to restrict the support member from rotating beyond a certain angle and from moving away from the third rotational element in rotational directions.

5 Claims, 6 Drawing Sheets

(51) Int. Cl.
*F16F 1/12* (2006.01)
*F16F 15/134* (2006.01)

(58) Field of Classification Search
CPC .............. F16F 15/1343; F16F 15/13438; F16F 15/13446; F16F 15/13453
USPC ........................... 464/68.1, 68.2, 68.9, 68.92
See application file for complete search history.

(56) References Cited

U.S. PATENT DOCUMENTS

| | | | | |
|---|---|---|---|---|
| 5,065,642 | A | * | 11/1991 | Kagiyama ......... F16F 15/13438 464/68.41 |
| 5,092,820 | A | * | 3/1992 | Naudin ............. F16F 15/12333 464/68.92 |
| 5,307,710 | A | | 5/1994 | Feldhaus et al. |
| 5,626,518 | A | * | 5/1997 | Maki ................. F16F 15/12326 464/68.92 |
| 7,445,553 | B2 | * | 11/2008 | Nakagaito ............... F16F 1/128 464/68.91 |
| 8,657,693 | B2 | * | 2/2014 | Watarai ............. F16F 15/12326 464/68.92 |
| 9,091,304 | B2 | * | 7/2015 | Takenaka ................. F16D 3/12 |
| 9,599,187 | B2 | | 3/2017 | Uehara et al. |

FOREIGN PATENT DOCUMENTS

| | | | |
|---|---|---|---|
| DE | 41 28 868 A1 | 3/1993 | |
| DE | 10035522 C1 * | 2/2002 | ........ F16F 15/13438 |
| DE | 10035522 C1 | 2/2002 | |
| DE | 10 2005 034 049 A1 | 3/2006 | |
| EP | 3026294 A2 | 1/2016 | |
| EP | 3026294 A2 | 6/2016 | |
| JP | 3843463 B2 | 11/2006 | |
| JP | 2013167309 A | 8/2013 | |
| JP | 2015161372 A | 9/2015 | |
| JP | 2016098954 A | 5/2016 | |

OTHER PUBLICATIONS

Written Opinion (PCT/ISA/237) dated Jan. 9, 2018, by the Japan Patent Office as the International Searching Authority for International Application No. PCT/JP2017/041554.

The extended European Search Report dated Nov. 15, 2019, by the European Patent Office in corresponding European Patent Application No. 17881950.4-1013. (9 pages).

Communication Pursuant to Article 94(3) EPC issued in Corresponding EP Application No.:17881950.4-1009; dated Mar. 7, 2022 (11 pages).

* cited by examiner

DAMPER DEVICE

CROSS-REFERENCE TO RELATED APPLICATIONS

This application is national stage application of International Application No. PCT/JP2017/041554, filed Nov. 17, 2017, which designates the United States, incorporated herein by reference, and which is based upon and claims the benefit of priority from Japanese Patent Application No. 2016-241251, filed Dec. 13, 2016, the entire contents of which are incorporated herein by reference.

TECHNICAL FIELD

The present invention relates to a damper device.

BACKGROUND ART

Conventionally, damper devices to be set between the output shaft of an engine and the input shaft of a transmission are known. A damper device includes two rotational elements connected to the output shaft and the input shaft, and an elastic element such as a coil spring intervenient between these rotational elements, for example. Such a damper device serves to damp rotational fluctuations from the engine with the elastic element.

A centrifugal force acts on the elastic element of the damper device. To prevent the elastic element from being detached from the rotational elements by the centrifugal force, the rotational elements are partially extended and placed closer to the outer circumference of the elastic element, for example (Patent Literature 1).

CITATION LIST

Patent Literature

Patent Document 1: Japanese Patent Application Laid-open No. 2015-161372

SUMMARY OF INVENTION

Problem to be Solved by the Invention

However, placing the extended part on the outer circumferential side of the elastic element results in increasing the size of the damper device. To prevent the damper device from increasing in size, the elastic element may be placed more radially inward, however, this will cause degradation in the torsional characteristics of the damper device.

In view of the above, the present invention provides a damper device including an elastic element placeable further radially outside.

Means for Solving Problem

A damper device according to one embodiment of the present invention, as an example, includes: a first rotational element rotatable about a rotational center; a second rotational element rotatable about the rotational center; a third rotational element rotatable about the rotational center; a first elastic element that is located between the first rotational element and the third rotational element and is elastically compressed by relative rotation of the first rotational element with respect to the third rotational element in one of rotational directions; a second elastic element that is located between the third rotational element and the second rotational element and is elastically compressed by relative rotation of the third rotational element with respect to the second rotational element in the one of the rotational directions; a support member that is intervenient between the third rotational element and the first elastic element, to support the first elastic element; and a restrictor provided with the third rotational element, to: rotatably support the support member in a plane orthogonal to the rotational center, restrict the support member from rotating beyond a certain angle, and restrict the support member from moving away from the third rotational element in the rotational directions. Consequently, as an example, the restrictor inhibits the support member and the first elastic element from being detached from the third rotational element, which makes it possible to place the first elastic element further radially outward without adding, on the outer circumferential side of the first elastic element, a member that restricts the first elastic element from moving radially outward.

In the damper device, as an example, the restrictor includes: a protrusion that protrudes from the third rotational element in a direction crossing radial directions, as viewed in axial directions, and a hook that protrudes from the protrusion away from the third rotational element in the rotational directions and comes into contact with the support member which is to move away from the third rotational element in the rotational directions. Consequently, as an example, the hook catches the support member which is to rotate, circumventing the restrictor in the rotational directions; thus, the support member and the first elastic element are further inhibited from being detached from the third rotational element.

In the damper device, as an example, the hook protrudes from the protrusion toward the rotational center in the radial directions, and the support member includes an engaging part located between the third rotational element and the hook in the rotational directions. Consequently, as an example, the hook catches the engaging part of the support member which is to rotate away from the rotational center; thus, the support member and the first elastic element are further inhibited from being detached from the third rotational element.

In the damper device, as an example, the hook extends toward the rotational center from a basal end to a distal end. Consequently, as an example, the hook catches the engaging part of the support member which is to rotate away from the rotational center; thus, the support member and the first elastic element are further inhibited from being detached from the third rotational element.

In the damper device, as an example, the third rotational element includes an arm extending in the radial directions, and the restrictor protrudes from an edge of the arm in the rotational directions. Consequently, as an example, the support member is inhibited from moving in the radial directions.

In the damper device, as an example, in a first width direction orthogonal to a direction in which the restrictor protrudes from the arm, the restrictor has a longer length at a distal end than a part closer to the arm than the distal end. Consequently, as an example, the end of the restrictor can easily come into contact with the support member which is to move away from the arm in the rotational directions. The support member is thus inhibited from moving away from the arm in the rotational directions.

In the damper device, as an example, the support member is provided with a concave opening toward the third rotational element in the rotational directions, and the restrictor is contained in the concave. Consequently, as an example, the support member is inhibited from moving in the radial directions.

In the damper device, as an example, the restrictor includes an arc-shaped edge recessed outward in the radial directions. Consequently, as an example, the support member can rotate about a contact point between the arc-shaped edge and the support member or about the center of the arc-shaped edge, for example.

In the damper device, as an example, the support member is provided with: a first contact edge facing the third rotational element, a second contact edge facing the third rotational element, an arc-shaped first inner edge that is connected to the first contact edge and contacts with the edge of the restrictor, and a second inner edge that connects the first inner edge and the second contact edge. Consequently, as an example, the support member can rotate about a contact point between the arc-shaped edge and the arc-shaped first inner edge or about the center of the arc-shaped edge.

In the damper device, as an example, the first inner edge and the second inner edge define at least part of the concave, and in a second width direction orthogonal to a direction in which the concave extends, the concave has a longer length at a distal end than at a part closer to the first contact edge and the second contact edge than the distal end. Consequently, as an example, the end of the restrictor comes into contact with the edge of the concave of the support member which is to move away from the arm in the rotational directions, thereby inhibiting the support member from moving away from the arm in the rotational directions.

DESCRIPTION OF EMBODIMENTS

First Embodiment

The following describes a first embodiment with reference to FIG. 1 to FIG. 7. In the present specification, elements according to embodiments and a description of the elements may be expressed in different manners. The elements and the description thereof expressed in different manners may be expressed in another manner not described herein. Further, any element and a description thereof not expressed in different manners may be expressed in another manner not described herein.

Figure 1:
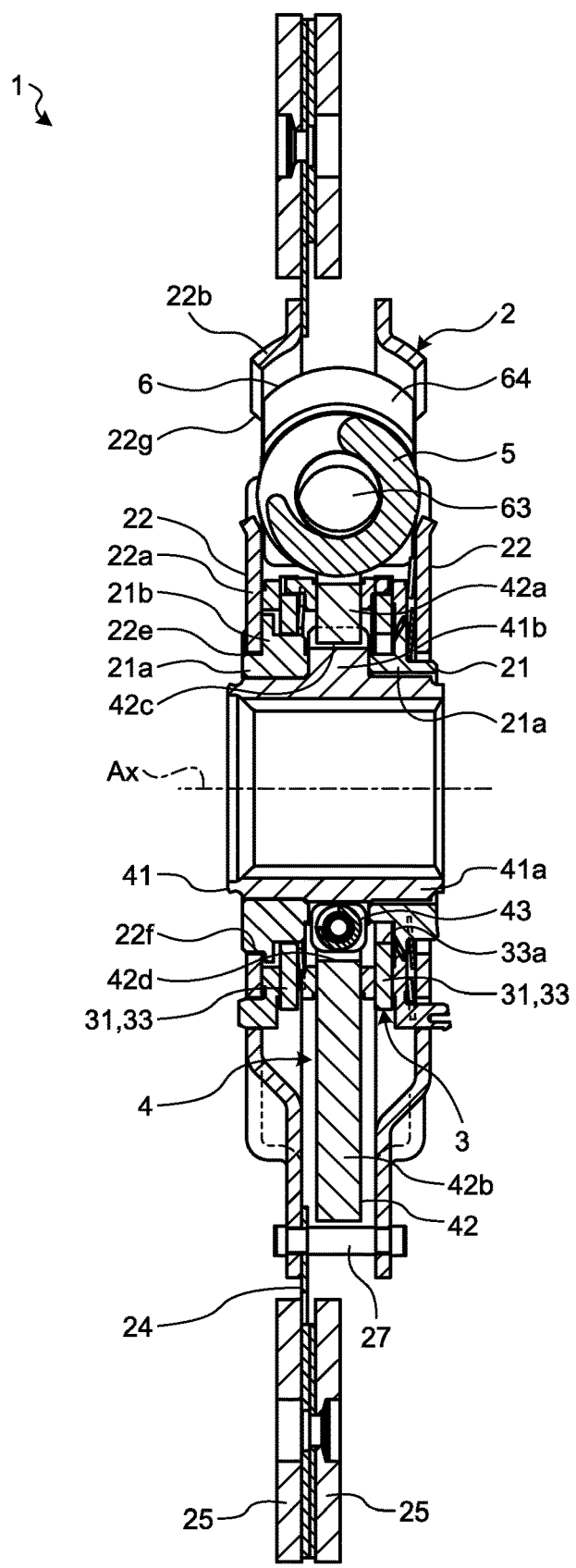
FIG. 1 is a sectional view of an exemplary damper device according to a first embodiment.

FIG. 1 is a sectional view of an exemplary damper device 1 according to the first embodiment. As illustrated in FIG. 1, the damper device 1 includes a drive plate 2 located outside, an intermediate plate 3 located inside, and a driven plate 4 located further inside. The drive plate 2 is an exemplary second rotational element. The intermediate plate 3 is an exemplary third rotational element. The driven plate 4 is an exemplary first rotational element.

The drive plate 2, the intermediate plate 3, and the driven plate 4 are individually rotatable about an axis Ax illustrated in FIG. 1. The axis Ax is an exemplary rotational center. In the following, directions orthogonal to the axis Ax, directions along the axis Ax, and rotational directions about the axis Ax are referred to as radial directions, axial directions, and circumferential directions or rotational directions, respectively.

The drive plate 2 is rotatable independently of the intermediate plate 3 and the driven plate 4. In other word, the drive plate 2, the intermediate plate 3, and the driven plate 4 are rotatable relative to one another.

The drive plate 2 is connected to a crankshaft of an engine via a flywheel, for example. The drive source is not limited to the engine and the drive plate 2 may be connected to another device or another drive source such as a motor.

The crankshaft extends along the axis Ax. The flywheel has a disc shape expanding in the radial directions, for example. The engine rotates the flywheel via the crankshaft, to rotate the drive plate 2 together with the flywheel. That is to say, the rotation caused by the engine is transmitted to the drive plate 2 via the flywheel.

The drive plate 2 includes a bush 21, two disc plates 22, a support plate 24, and two linings 25 in order from the axis Ax. The support plate 24 can also be referred to as a cushion spring, for example. The linings 25 can also be referred to as a friction material, for example.

The bush 21 includes two bosses 21a and a plurality joints 21b. The bosses 21a have a substantially cylindrical shape extending along the axis Ax. The two bosses 21a are juxtaposed with a gap in the axial directions. The joints 21b each protrude radially outward from the outer circumferences of the two bosses 21a.

Figure 2:
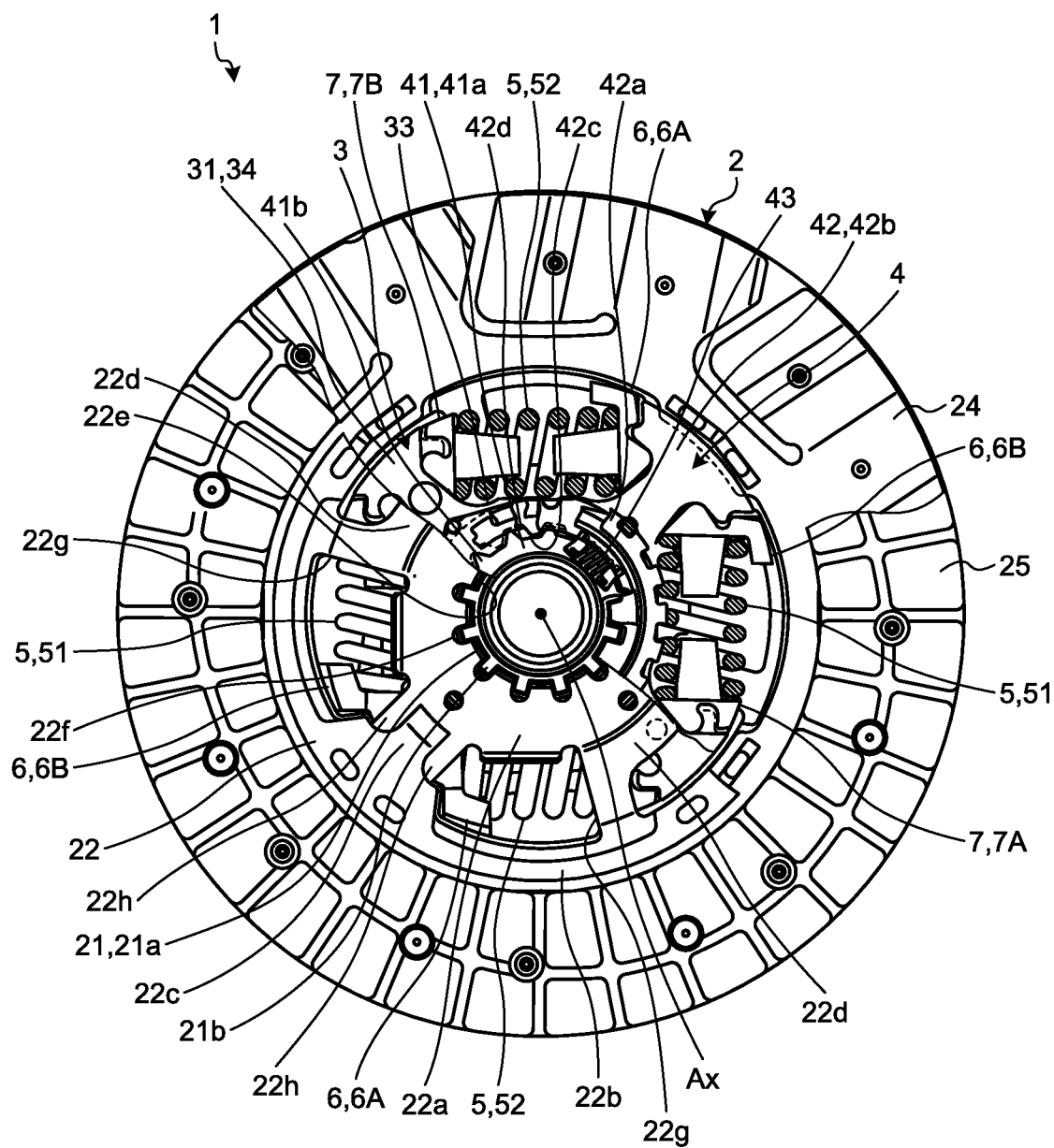
FIG. 2 is an elevational view of the exemplary damper device of the first embodiment with part of a disc plate cut away.

FIG. 2 is an elevational view of the exemplary damper device 1 of the first embodiment with part of the disc plate 22 cut away. As illustrated in FIG. 2, the disc plate 22 has a disc shape extending in the radial directions. The two disc plates 22 each have an inner frame 22a, an outer frame 22b, two first frames 22c, and two second frames 22d. FIG. 2 illustrates only one of the two first frame 22c. The numbers of the first frames 22c and the second frames 22d are not limited to this example.

The inner frame 22a has a disc shape extending in the radial directions and is provided with a fitting hole 22e extending along the axis Ax. The inner frame 22a is further provided with a spline 22f. The spline 22f is formed of a plurality of grooves extending in the radial directions from the inner circumference of the fitting hole 22e.

As illustrated in FIG. 1, one of the bosses 21a of the bush 21 fits into the fitting hole 22e. The joints 21b protruding from the boss 21a are fit into the spline 22f of the disc plate 22. Thereby, the disc plate 22 is attached to the bush 21, and the disc plate 22 and the bush 21 are integrally rotatable about the axis Ax.

As illustrated in FIG. 2, the outer frame 22b has a disc shape surrounding the inner frame 22a with spacing. The first frames 22c and the second frames 22d connect the outer circumference of the inner frame 22a and the inner circumference of the outer frame 22b.

The two first frames 22c extend from the inner frame 22a in radially opposite directions. The two second frames 22d extend from the inner frame 22a in radially opposite directions. Although in the present embodiment the extending direction of the first frames 22c and the extending direction of the second frames 22d are substantially orthogonal to each other, the extending directions of the first and second frames 22c and 22d are not limited to this example.

The inner frame 22a, the outer frame 22b, the first frames 22c, and the second frames 22d define a plurality of openings 22g. The openings 22g expose the inside of the damper device 1 covered with the disc plate 22.

As illustrated in FIG. 1, the two disc plates 22 are juxtaposed with a gap in the axial directions. The two disc plates 22 are connected to each other through a first connecting member 27 extending in the axial directions.

Both ends of the first connecting member 27 are fixed to the two disc plates 22 by caulking, for example. The first connecting member 27 restricts relative rotation of the two disc plates 22. Thus, the two disc plates 22 are integrally rotatable about the axis Ax.

The two disc plates 22 have substantially the same shape, however, they may have different shapes. The inner frames 22a, the outer frames 22b, the first frames 22c, and the second frames 22d of the two disc plates 22 are juxtaposed in the axial directions. Consequently, the openings 22g of one of the disc plates 22 and the openings 22g of the other disc plate 22 are at corresponding positions.

The support plate 24 has a disc shape larger than the outer frame 22b of the disc plate 22. An inner circumferential part of the support plate 24 is attached to the outer frame 22b of the one of the disc plates 22 through the first connecting member 27 or with a screw, for example. The support plate 24 extends radially outward from the outer frame 22b of the disc plate 22. The support plate 24 may be attached to another part.

The linings 25 have a disc shape surrounding the disc plate 22 with spacing, for example. The two linings 25 are attached to both axial sides of the outer circumference of the support plate 24. The two linings 25 are in contact with the flywheel.

Along with the rotation of the flywheel, the drive plate 2 is rotated by a frictional force between the flywheel and the linings 25. Excessive torque acting on the damper device 1 causes sliding between the linings 25 and the flywheel.

The intermediate plate 3 is located between the two disc plates 22 in the axial directions. The intermediate plate 3 includes two plates 31. The two plates 31 are juxtaposed with a gap in the axial directions.

Figure 3:
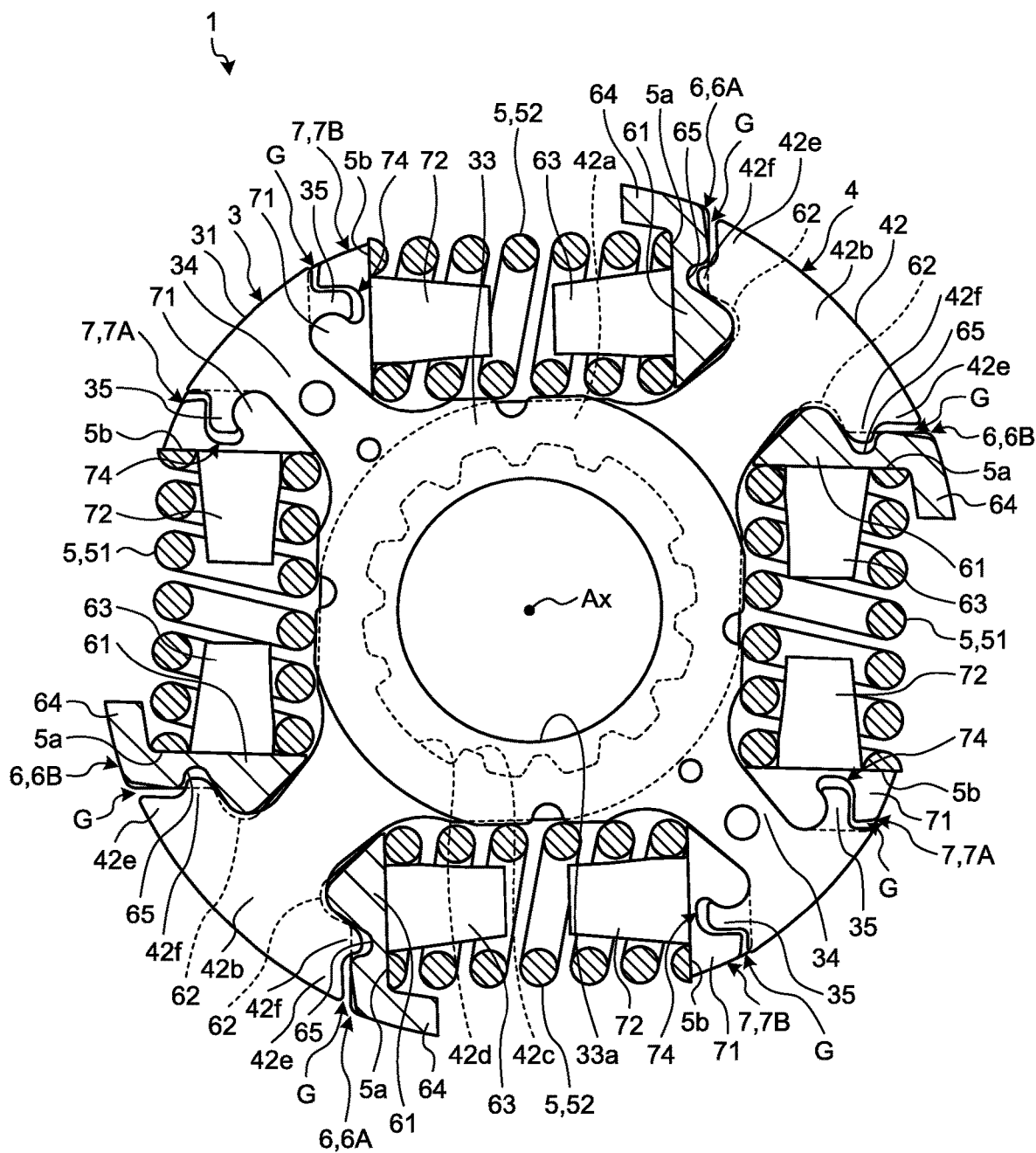
FIG. 3 is an elevational view of the damper device of the first embodiment with a drive plate omitted.

FIG. 3 is an elevational view of the damper device 1 of the first embodiment with the drive plate 2 omitted. As illustrated in FIG. 3, each of the plates 31 includes an intermediate part 33 and two arms 34. The number of the arms 34 is not limited to two.

The intermediate part 33 has a disc shape expanding in the radial directions and is provided with an insertion hole 33a extending along the axis Ax. As illustrated in FIG. 1, the boss 21a of the bush 21 of the drive plate 2 is fit into the insertion hole 33a. The boss 21a and the plate 31 are relatively rotatable about the axis Ax.

The boss 21a fits into the insertion hole 33a to limit radial movement of the plate 31. In other words, the boss 21a of the bush 21 places (centers) the plate 31 in line with the axis Ax.

As illustrated in FIG. 3, the two arms 34 extend in radially opposite directions from the intermediate part 33. In FIG. 3, the two arms 34 extend upward to the left and downward to the right. In the radial directions, the length from the axis Ax to the outer circumference of each arm 34 is shorter than the length from the axis Ax to the outer circumference of the outer frame 22b of the disc plate 22.

The arms 34 are each provided with two projections 35 near the tip. The projections 35 are an exemplary restrictor. The projections 35 protrude from the arm 34 to both sides substantially in the circumferential directions. In other words, the two projections 35 protrude in circumferentially opposite directions from the tip of the arm 34.

Figure 4:
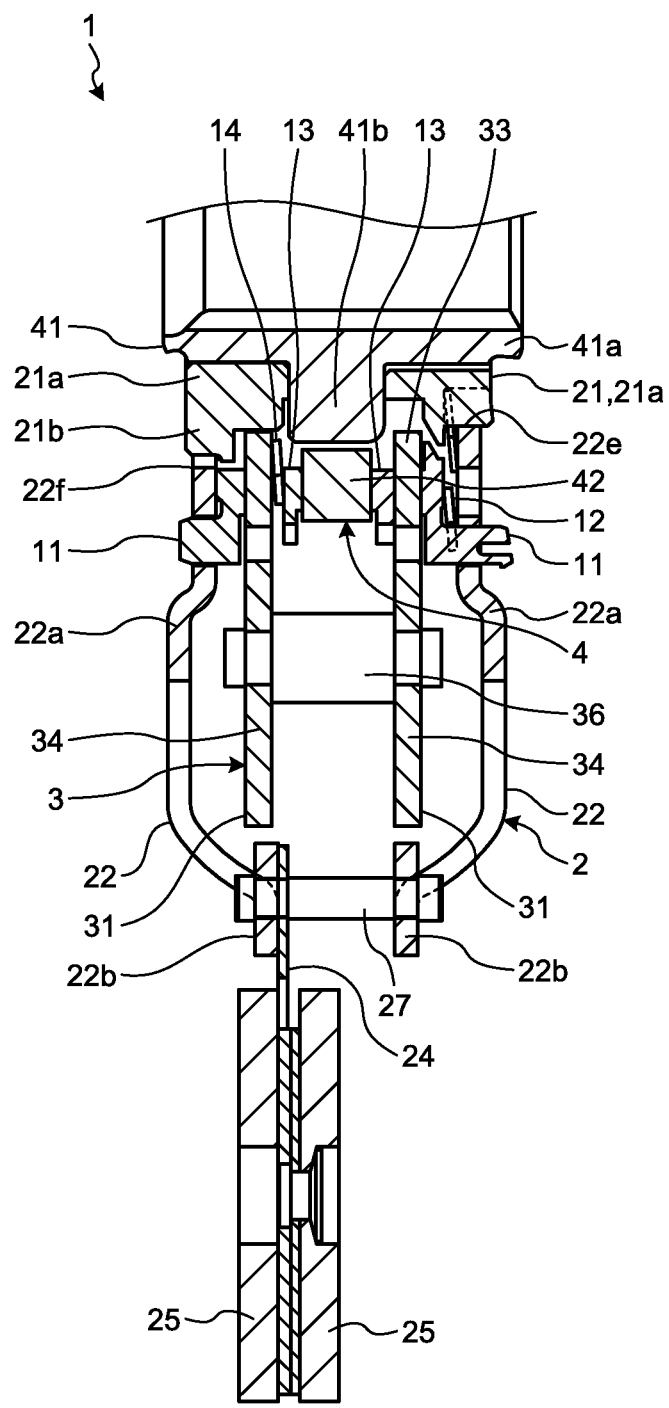
FIG. 4 is a partial sectional view of the exemplary damper device of the first embodiment in a position different from in FIG. 1.

FIG. 4 is a sectional view of part of the exemplary damper device 1 of the first embodiment at a position different from in FIG. 1. As illustrated in FIG. 4, a second connecting member 36 extends in the axial directions and is attached to the two plates 31.

The second connecting member 36 connects the two plates 31 to each other. Both ends of the second connecting member 36 are fixed to the two plates 31 by caulking, for example. The second connecting member 36 restricts the two plates 31 from relatively rotating. Thus, the two plates 31 are integrally rotatable about the axis Ax.

The two plates 31 have substantially the same shape but they may have different shapes. The intermediate parts 33 and the arms 34 of the two plates 31 are juxtaposed in the axial directions. Thus, the arms 34 of one of the plates 31 and the arms 34 of the other plate 31 are at corresponding positions.

The driven plate 4 is connected to a transmission via an input shaft, for example. The driven plate 4 may be connected to another device such as a motor in place of the transmission. As illustrated in FIG. 1, the driven plate 4 includes an inner hub 41, an outer hub 42, and a spring 43.

The inner hub 41 includes a boss 41a and a plurality of joints 41b. The boss 41a has a substantially cylindrical shape extending along the axis Ax. The input shaft is fit into the boss 41a. Rotation is transmitted between the boss 41a and the input shaft via a spline or a key, for example.

The boss 41a of the inner hub 41 is fit in the bosses 21a of the bush 21 of the drive plate 2. The boss 41a of the inner hub 41 and the bosses 21a of the bush 21 are relatively rotatable about the axis Ax.

The joints 41b protrude in the radial directions from the outer circumference of the boss 41a. The joints 41b are located between the two bosses 21a of the bush 21 of the drive plate 2 in the axial directions.

The outer hub 42 is located between the two plates 31 of the intermediate plate 3 in the axial directions. The location of the outer hub 42 is not limited to this example and may be located outside the two plates 31.

As illustrated in FIG. 3, the outer hub 42 includes an intermediate part 42a and two arms 42b. FIG. 3 illustrates the driven plate 4 with the inner hub 41 and the spring 43 omitted. The number of the arms 42b is not limited to two.

The intermediate part 42a has a disc shape expanding in the radial directions and is provided with an insertion hole 42c extending along the axis Ax. The intermediate part 42a is further provided with a spline 42d. The spline 42d is formed of a plurality of grooves extending in the radial directions from the inner circumference of the insertion hole 42c.

As illustrated in FIG. 1, the boss 41a of the inner hub 41 is fit into the insertion hole 42c of the outer hub 42. The boss 41a of the inner hub 41 and the outer hub 42 are relatively rotatable about the axis Ax.

The joints 41b of the inner hub 41 are fit into the spline 42d of the outer hub 42. In the circumferential directions, there is a gap between the end of the spline 42d of the outer hub 42 and the end of the joints 41b of the inner hub 41. Thus, the inner hub 41 and the outer hub 42 are relatively rotatable at a certain angle.

As the inner hub 41 and the outer hub 42 relatively rotate by a certain angle, the end of the spline 42d of the outer hub 42 and the end of the joints 41b of the inner hub 41 come into contact with each other in the circumferential directions. By this contact, the inner hub 41 and the outer hub 42 are restricted from further rotating relative to each other.

The spring 43 is a coil-shaped compression spring. The spring 43 is situated in a gap between the end of the spline 42d of the outer hub 42 and the end of the joints 41b of the inner hub 41 in the circumferential directions. In other words, the spring 43 is intervenient between the inner hub 41 and the outer hub 42 in the circumferential directions.

As the inner hub 41 and the outer hub 42 relatively rotate about the axis Ax, the spring 43 is compressed by the end of the spline 42d of the outer hub 42 and the end of the joints 41b of the inner hub 41 in the circumferential directions. The spring 43 exerts a force on the inner hub 41 and the outer hub 42 relatively rotating about the axis Ax in one direction to cause them to rotate in the opposite direction.

As illustrated in FIG. 3, the two arms 42b of the outer hub 42 extend in radially opposite directions from the intermediate part 42a. In FIG. 3, the two arms 42b extend upward to the right and downward to the left. In the radial directions, the length from the axis Ax to the outer circumference of each arm 42b is shorter than the length from the axis Ax to the outer circumference of the outer frame 22b of the disc plate 22.

As illustrated in FIG. 2, with no external force acting on the drive plate 2 and the driven plate 4, the arms 42b of the outer hub 42 are overlaid on the first frame 22c of the disc plate 22 of the drive plate 2 in the axial directions. The positions of the arms 42b of the outer hub 42 and the first frame 22c of the disc plate 22 are not limited to this example.

As illustrated in FIG. 3, the arms 42b each include two overhangs 42e at the tip. The overhangs 42e protrude from the tip of the arm 42b to both sides in the circumferential directions. In other words, the two overhangs 42e protrude in circumferentially opposite directions from the tip of the arm 42b.

The damper device 1 further includes four torsion springs 5, four first sheets 6, and four second sheets 7. The second sheets 7 are an exemplary support member. The numbers of the torsion springs 5 and the first and second sheets 6 and 7 are not limited to this example.

As illustrated in FIG. 2, each torsion spring 5 is a coil-shaped compression spring (a coil spring). The torsion spring 5 is located between the arm 42b of the outer hub 42 of the driven plate 4 and the arm 34 of the plate 31 of the intermediate plate 3 in the circumferential directions. At the same time, the torsion spring 5 is located between the first frame 22c of the disc plate 22 of the drive plate 2 and the arm 34 of the plate 31 of the intermediate plate 3.

The first sheets 6 and the second sheets 7 are made of a synthetic resin material, for example. The first sheets 6 and the second sheets 7 may be made of another material.

The four first sheets 6 are detachably supported by both circumferential sides of the two first frames 22c of the disc plate 22 of the drive plate 2. As illustrated in FIG. 3, the four first sheets 6 are also detachably supported by both circumferential sides of the two arms 42b of the outer hub 42 of the driven plate 4, respectively. The first sheets 6 are supported by the overhangs 42e of the arms 42b of the outer hub 42. The four first sheets 6 each include a support wall 61, two extension walls 62, a convex 63, and a cover 64.

The support wall 61 covers a circumferential end of the arm 42b of the outer hub 42 of the driven plate 4. The support wall 61 supports one end 5a of the torsion spring 5.

The two extension walls 62 extend in the circumferential directions from the support wall 61 and are juxtaposed with a gap in the axial directions. In the axial directions, the arm 42b of the outer hub 42 is located between the two extension walls 62. Further, in the axial directions, the two extension walls 62 are located between the first frames 22c of the two disc plates 22 of the drive plate 2. Thereby, the arm 42b of the outer hub 42 and the first frame 22c of the disc plate 22 work to restrict the first sheet 6 from moving in the axial directions.

The support wall 61 is provided with a recess 65. The recess 65 is a bottomed hole opening in the circumferential directions and is located between the two extension walls 62 in the axial directions. The overhang 42e of the outer hub 42 is fit into the recess 65. Thus, the first sheet 6 is supported by the overhang 42e of the outer hub 42.

The overhang 42e of the outer hub 42 is provided with a convex 42f which is inserted into the recess 65, for example. By the convex 42f in contact with the inner face of the recess 65, the overhang 42e of the outer hub 42 supports the first sheet 6.

There is a gap G at least either radially inside or outside the overhang 42e across the convex 42f and the recess 65. That is to say, while the outer hub 42 supports the first sheet 6, the gap (space) G lies between the outer hub 42 and the first sheet 6.

Owing to the gap G, the first sheet 6 is rotatable (swingable) with respect to the outer hub 42 in a plane orthogonal to the axial directions. That is, as viewed in the axial directions in FIG. 3, the first sheet 6 can rotate about the rotational center extending parallel to the axis Ax. The rotational center of the first sheet 6 corresponds to a contact point between the convex 42f and the recess 65, for example, and is changeable in position in accordance with the rotation of the first sheet 6. In other words, the first sheet 6 is rotatable with respect to the driven plate 4 while changing the position of the rotational center parallel to the axis Ax. The rotational center of the first sheet 6 may be at a fixed position.

As illustrated in FIG. 2, the first frame 22c of the disc plate 22 of the drive plate 2 is provided with an accommodation part 22h. The accommodation part 22h is a recess opening in the circumferential directions.

The extension walls 62 of the first sheet 6 are individually fit in the accommodation part 22h. The extension walls 62 of the first sheet 6 contact with the inner face of the accommodation part 22h. Thereby, the first sheet 6 is rotatably supported by the first frame 22c of the disc plate 22 in the plane orthogonal to the axial directions.

The first sheet 6 is rotatable about the supported part by the driven plate 4 and the drive plate 2, in a direction toward or away from the axis Ax. The first sheet 6 is rotatable within a certain range. That is to say, when rotating until no gap G remains, the first sheet 6 comes into contact with the driven plate 4 or the drive plate 2 and is restricted from rotating further.

While the driven plate 4 and the drive plate 2 relatively rotate, the first sheet 6 is supported by either the driven plate 4 or the drive plate 2. Along with the relative rotation of the driven plate 4 and the drive plate 2, the driven plate 4 moves leftward in FIG. 2, for example. In this case, in the circumferential directions first sheets 6A are supported by the driven plate 4 and separated from the drive plate 2. The other first sheets 6B are supported by the drive plate 2 and separated from the driven plate 4 in the circumferential directions.

The first sheets 6A of the first sheets 6 are located in the counterclockwise direction of the first frame 22c of the drive plate 2 and the arm 42b of the driven plate 4. The first sheets 6B of the first sheets 6 are located in the clockwise direction of the first frame 22c of the drive plate 2 and the arm 42b of the driven plate 4.

As illustrated in FIG. 3, the convex 63 protrudes from the support wall 61 substantially in the circumferential directions. The convex 63 protrudes toward the arm 34 of the plate 31 of the intermediate plate 3, for example. The convex 63 has a substantially cylindrical shape but may have another shape.

The convex 63 is inserted into the torsion spring 5 from the end 5a. In other words, the convex 63 is situated inside the torsion spring 5. Thereby, the convex 63 restricts the torsion spring 5 from moving in the radial directions and the axial directions.

The cover 64 extends from the support wall 61 in the circumferential directions. The cover 64 extends in a direction opposite to the two extension walls 62. The cover 64 covers part of the torsion spring 5 from radially outside. When the torsion spring 5 bends radially outward by a centrifugal force, the cover 64 comes into contact with the torsion spring 5 to restrict the torsion spring 5 from moving radially outward.

The four second sheets 7 are supported by both circumferential sides of the two arms 34 of the plate 31 of the intermediate plate 3, respectively. The four second sheets 7 each have a support wall 71 and a convex 72.

Figure 5:
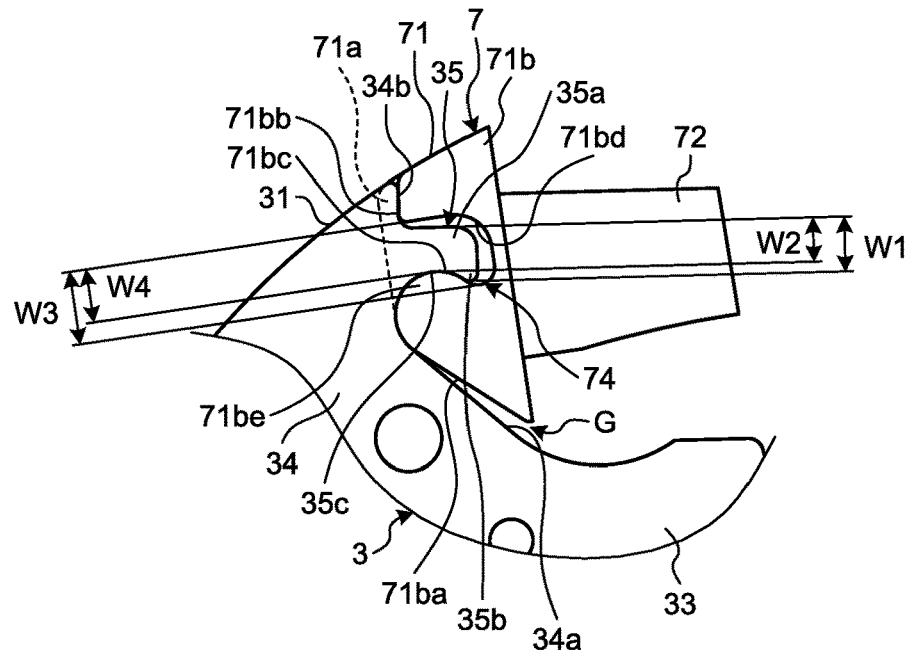
FIG. 5 is an elevational view of an example of a part of an intermediate plate and a second sheet in the first embodiment.

FIG. 5 is an elevational view of an example of part of the intermediate plate 3 and the second sheet 7 of the first embodiment. As illustrated in FIG. 5, the support wall 71 covers a circumferential end of the arm 34 of the plate 31 of the intermediate plate 3. As illustrated in FIG. 3, the support wall 71 supports the other end 5b of the torsion spring 5.

As illustrated in FIG. 5, the support wall 71 includes an intervenient part 71a and two sides 71b. The intervenient part 71a and the two sides 71b are integrated together. In the axial directions, the intervenient part 71a is located between the two sides 71b.

The intervenient part 71a is located between the arms 34 of the two plates 31 of the intermediate plate 3 in the axial directions. Thereby, the arms 34 of the two plates 31 of the intermediate plate 3 restrict the second sheet 7 from moving in the axial directions.

The two sides 71b are at substantially the same position as the arms 34 of the two plates 31 of the intermediate plate 3 in the axial directions. The two sides 71b are each provided with a concave 74. The concave 74 is a cutout opening in the axial directions and toward the arm 34 in the circumferential directions. The projection 35 of the intermediate plate 3 is contained in the concave 74, whereby the second sheet 7 is supported by the two arms 34 of the plate 31 of the intermediate plate 3.

The following specifically describes the intermediate plate 3 supporting the second sheet 7. The arms 34 of the intermediate plate 3 each have two first side edges 34a and two second side edges 34b.

The two first side edges 34a are both circumferential side edges of the arm 34. The first side edges 34a are located between the intermediate part 33 and the projection 35 in the radial directions. The two second side edges 34b are also both circumferential side edges of the arm 34. The second side edges 34b are each located between the projection 35 and the tip of the arm 34. Consequently, the projection 35 is located between the first side edge 34a and the second side edge 34b.

The projection 35 protrudes from the side edges (the first and second side edges 34a and 34b) of the arm 34 of the intermediate plate 3. The projection 35 includes a protruding part 35a and a hook 35b. The hook 35b can also be referred to as a tab, a latch, or a convex, for example.

The protruding part 35a protrudes from the arm 34 in a direction crossing the radial directions, as viewed in the axial directions in FIG. 5. In the present embodiment, the protruding part 35a protrudes toward the first sheet 6 supported by the drive plate 2 and the driven plate 4. The protruding part 35a may protrude in another direction such as the circumferential directions. The protruding part 35a has a substantially rectangular plate shape, for example.

The hook 35b protrudes from the distal end of the protruding part 35a toward the axis Ax in the radial directions. In other words, the hook 35b extends toward the axis Ax from the basal end to the distal end. The hook 35b may protrude from another location or in another direction such as radially inward as long as it protrudes from the protruding part 35a away from the arm 34 in the circumferential directions.

Provided with the hook 35b, the projection 35 has a wider width W1 at the distal end than a width W2 at a part closer to the arm 34 than the distal end. The widths W1 and W2 are the lengths of the projection 35 in a direction orthogonal to the protruding direction of the protruding part 35a from the arm 34. The width W2 is the smallest width of the projection 35. Thus, the projection 35 includes a part closer to the arm 34 than a certain part and smaller in width than the certain part.

Due to the hook 35b, the projection 35 has a curved edge 35c. The curved edge 35c can also be referred to as a recess or a concave, for example. The curved edge 35c is located between the hook 35b and the first side edge 34a. The curved edge 35c of the projection 35 is an arc-shaped edge recessed radially outward.

As described above, the projection 35 is contained in the concave 74 of the second sheet 7. The side 71b of the second sheet 7 includes a first contact edge 71ba, a second contact edge 71bb, a first inner edge 71bc, and a second inner edge 71bd.

The first contact edge 71ba faces the first side edge 34a of the arm 34. The second contact edge 71bb faces the second side edge 34b of the arm 34. The second contact edge 71bb s part of the concave 74.

The first inner edge 71bc is connected to an end of the first contact edge 71ba and has an arc shape. The first inner edge 71bc faces the curved edge 35c of the projection 35. The first inner edge 71bc has substantially the same radius as the curved edge 35c of the projection 35 and is in contact with the curved edge 35c.

Due to the first inner edge 71bc, the side 71b of the support wall 71 is provided with an engaging part 71be. In the present embodiment, the engaging part 71be is a substantially semicircular part defined by the first inner edge 71bc. The engaging part 71be is located between the arm 34 and the hook 35b in the circumferential directions.

The second inner edge 71bd connects an end of the first inner edge 71bc and an end of the second contact edge 71bb to each other. The second inner edge 71bd faces the projection 35 with spacing.

The first and second inner edges 71*bc* and 71*bd* form part of the concave 74. The part of the concave 74 formed by the first and second inner edges 71*bc* and 71*bd* has a substantially rectangular shape extending from the first and second contact edges 71*ba* and 71*bb* substantially in the circumferential directions.

Due to the arc-shaped first inner edge 71*bc*, the end of the concave 74 has a wider width W3 than a width W4 of a part closer to the first and second contact edges 71*ba* and 71*bb* than the end. The widths W3 and W4 are the lengths of the concave 74 in a direction orthogonal to the extending direction of the concave 74. The width W4 is the smallest width of the concave 74. Thus, the concave 74 has a part closer to the first and second contact edges 71*ba* and 71*bb* than a certain part and smaller in width than the certain part.

By the contact between the first inner edge 71*bc* and the curved edge 35*c* of the projection 35, the second sheet 7 is supported by the projection 35. There is a gap (space) G at least either radially inside or outside the second sheet 7 across the projection 35. That is to say, the gap (space) G lies at least either between the first side edge 34*a* of the arm 34 and the first contact edge 71*ba* of the support wall 71 or between the second side edge 34*b* of the arm 34 and the second contact edge 71*bb* of the support wall 71. That is, while the arm 34 supports the second sheet 7, the gap G lies between the arm 34 and the second sheet 7.

Owing to the gap G, the second sheet 7 supported by the projection 35 is rotatable (swingable) with respect to the arm 34 in a plane orthogonal to the axis Ax. That is to say, as viewed in the axial directions in FIG. 5, the second sheet 7 can rotate about the rotational center extending parallel to the axis Ax. The rotational center of the second sheet 7 corresponds to a contact point between the curved edge 35*c* and the first inner edge 71*bc*, for example, and is changeable in position in accordance with the rotation of the second sheet 7. In other words, the second sheet 7 is rotatable with respect to the intermediate plate 3 while changing the position of the rotational center parallel to the axis Ax. The rotational center of the second sheet 7 may be at a fixed position such as the center of the arc-shaped first inner edge 71*bc*.

Along with the rotation of the second sheet 7 toward the axis Ax (clockwise direction in FIG. 5), the gap G between the first side edge 34*a* and the first contact edge 71*ba* decreases. With no gap G remaining, the first side edge 34*a* comes into contact with the first contact edge 71*ba*.

The second sheet 7 is to further rotate toward the axis Ax about a contact point between the first side edge 34*a* and the first contact edge 71*ba* as a fulcrum point. In this case, the hook 35*b* supports the engaging part 71*be* of the second sheet 7 to limit the second sheet 7 from further rotating.

Meanwhile, as the second sheet 7 rotates in a direction away from the axis Ax (counterclockwise direction in FIG. 5), the gap G between the second side edge 34*b* and the second contact edge 71*bb* decreases. With no gap G remaining, the second side edge 34*b* comes into contact with the second contact edge 71*bb* as in FIG. 5.

The second sheet 7 is to further rotate away from the axis Ax about a contact point between the second side edge 34*b* and the second contact edge 71*bb* as fulcrum point. In this case, the hook 35*b* supports the engaging part 71*be* of the second sheet 7 to restrict the second sheet 7 from further rotating. Thus, the projection 35 restricts the second sheet 7 from rotating beyond a certain angle.

The hook 35*b* comes into contact with the engaging part 71*be* of the second sheet 7 which is to moves away from the arm 34 in the circumferential directions, to thereby restrict the second sheet 7 from further moving. However, the first inner edge 71*bc* may slide with respect to the hook 35*b*, causing the second sheet 7 to slightly move away from the arm 34 in the circumferential directions. In this case, due to the end of the projection 35 having the width W1 larger than the smallest width W4 of the concave 74, the hook 35*b* comes into contact with the engaging part 71*be* again to restrict the second sheet 7 from further moving. Thus, the projection 35 restricts the second sheet 7 from moving away from the arm 34 in the circumferential directions.

When the second sheet 7 is to move with respect to the arm 34 in the radial directions, the projection 35 comes into contact with the first inner edge 71*bc* or the second inner edge 71*bd* of the concave 74 to restrict the second sheet 7 from further moving. Thus, the projection 35 restricts the second sheet 7 from moving with respect to the arm 34 in the radial directions.

As described above, the projection 35 of the intermediate plate 3 rotatably supports the second sheet 7. The projection 35 of the intermediate plate 3 and the concave 74 of the second sheet 7 are fit together, thereby restricting the radial and circumferential movements of the second sheet 7 with respect to the intermediate plate 3 and restricting the rotation of the second sheet 7 beyond a certain angle.

The convex 72 of the second sheet 7 protrudes from the support wall 71 substantially in the circumferential directions. In the present embodiment, the convex 72 of the second sheet 7 protrudes toward the first sheet 6. Further, the convex 63 of the first sheet 6 protrudes toward the second sheet 7. The convex 72 has a substantially cylindrical shape but may have another shape.

As illustrated in FIG. 3, the convex 72 is inserted into the torsion spring 5 from the end 5*b*. In other words, the convex 72 is placed inside the torsion spring 5. Thus, the convex 72 restricts the torsion spring 5 from moving in the radial directions and the axial directions.

The torsion spring 5 is intervenient between the first sheet 6 supported by the driven plate 4 and the drive plate 2, and the second sheet 7 supported by the intermediate plate 3 in the circumferential directions. Consequently, the first sheet 6 intervenes between the driven plate 4 and the drive plate 2, and the torsion spring 5. The second sheet 7 is intervenes between the intermediate plate 3 and the torsion spring 5.

Along with the relative rotation among the driven plate 4, the intermediate plate 3, and the drive plate 2, the torsion spring 5 supported by the first and second sheets 6 and 7 is compressed and elastically deformed. The following describes clockwise rotation of the driven plate 4 with respect to the drive plate 2 in FIG. 2. The clockwise direction is an exemplary one of rotational directions.

In the following, two of the four torsion springs 5 are referred to as first torsion springs 51, whereas the other two of the four torsion springs 5 are referred to as second torsion springs 52. The first torsion springs 51 are an exemplary first elastic element. The second torsion springs 52 are an exemplary second elastic element. The first torsion springs 51 and the second torsion springs 52 are arranged alternately in the circumferential directions.

In the following, two of the four second sheets 7 are referred to as second sheets 7A, whereas the other two of the four second sheets 7 are referred to as second sheets 7B. The second sheets 7A are located in the counterclockwise direction of the intermediate plate 3. The second sheets 7B are located in the clockwise direction of the intermediate plate 3.

The first torsion springs 51 are each located between the arm 42*b* of the driven plate 4 to rotate and the arm 34 of the intermediate plate 3 toward which the driven plate 4 moves. Consequently, the first torsion spring 51 is located between the first sheet 6B and the second sheet 7A.

The second torsion springs 52 are each located between the arm 34 of the intermediate plate 3 and the first frame 22c of the drive plate 2 toward which the intermediate plate 3 moves. Consequently, the second torsion spring 52 is located between the first sheet 6A and the second sheet 7B.

The driven plate 4 rotates clockwise with respect to the intermediate plate 3, for example, while decreasing in angle relative to the intermediate plate 3 about the axis Ax. This shortens the distance between the first sheet 6B supported by the driven plate 4 and the second sheet 7A supported by the intermediate plate 3, to elastically compress the first torsion spring 51 supported by the first sheet 6B and the second sheet 7A. The compressed first torsion spring 51 pushes the intermediate plate 3 and the driven plate 4 so as to increase the angle between the intermediate plate 3 and the driven plate 4.

Further, the intermediate plate 3 rotates clockwise with respect to the drive plate 2, while decreasing in angle relative to the drive plate 2 about the axis Ax. This shortens the distance between the first sheet 6A supported by the drive plate 2 and the second sheet 7B supported by the intermediate plate 3, to elastically compress the second torsion spring 52 supported by the first sheet 6A and the second sheet 7B. The compressed second torsion spring 52 pushes the drive plate 2 and the intermediate plate 3 so as to increase the angle between the drive plate 2 and the intermediate plate 3.

With no external force acting on the drive plate 2 and the driven plate 4, the angle between the drive plate 2 and the intermediate plate 3 about the axis Ax is maintained constant by the four torsion springs 5. Similarly, the angle between the intermediate plate 3 and the driven plate 4 is maintained constant. In this process, the extending direction of the arms 34 of the intermediate plate 3 and the extending direction of the arms 42b of the driven plate 4 are substantially orthogonal to each other. The extending directions of the arms 34 and 42b are not limited to this example.

The torsion springs 5 push the first sheets 6 toward the drive plate 2 and the driven plate 4. Thereby, the first sheets 6 are supported by at least one of the drive plate 2 and the driven plate 4. Similarly, the torsion springs 5 push the second sheets 7 toward the intermediate plate 3. Thereby, the second sheets 7 are supported by the intermediate plate 3.

The torsion springs 5 push the first sheets 6 and the second sheets 7 that are rotatable. By the elastic force of the torsion springs 5, the support walls 61 of the first sheets 6 and the support walls 71 of the second sheets 7 are maintained substantially in parallel to each other while no external force acts on the drive plate 2 and the driven plate 4.

As described above, the drive plate 2 of the damper device 1 is connected to the crankshaft of the engine via the flywheel. The driven plate 4 is connected to the transmission via the input shaft. Torque is transmitted to the flywheel by driving of the engine and transmitted from the drive plate 2 to the driven plate 4 via the first sheet 6, the torsion spring 5, the second sheet 7, the intermediate plate 3, the second sheet 7, the torsion spring 5, and the first sheet 6, for example. The driven plate 4 transmits the torque to the transmission via the input shaft.

The rotational speed of the crankshaft of the engine fluctuates by a driver's operation and/or the stroke of the engine. Because of such a variation in the rotational speed of the crankshaft, the rotational speed of the input shaft may exceed the rotational speed of the crankshaft. In this case, torque can be transmitted from the driven plate 4 to the drive plate 2 via the first sheet 6, the torsion spring 5, the second sheet 7, the intermediate plate 3, the second sheet 7, the torsion spring 5, and the first sheet 6, for example.

In the torque transmission path between the drive plate 2 and the driven plate 4, the first torsion springs 51 and the second torsion springs 52 are connected in series. The spring constant of two serially connected springs is calculated as a quarter of the spring constant of the two parallel-connected springs. Consequently, the damper device 1 including the first torsion spring 51 and the second torsion spring 52 connected in series may be lower in torsional rigidity than the one including the first torsion spring 51 and the second torsion spring 52 connected in parallel.

In the present embodiment, the first torsion springs 51 and the second torsion springs 52 have substantially the same spring constant. However, the first torsion springs 51 and the second torsion springs 52 may have different spring constants, so that the damper device 1 may exert different torsional rigidities that change in accordance with a torsional angle, for example.

As illustrated in FIG. 4, the damper device 1 further includes a plurality of first friction members 11, a first leaf spring 12, a plurality of second friction members 13, and a second leaf spring 14. The first and second friction members 11 and 13 can also be referred to as thrust members, for example.

The first friction members 11 are attached to the two disc plates 22 of the drive plate 2, respectively. The first friction members 11 are intervenient between the drive plate 2 and the intermediate plate 3 in the axial directions. The first friction members 11 generate a frictional force with the intermediate plate 3.

The first leaf spring 12 is intervenient between the first friction member 11 and the disc plate 22. The first leaf spring 12 pushes the first friction member 11 toward the intermediate plate 3. The first leaf spring 12 increases the frictional force occurring between the first friction member 11 and the intermediate plate 3.

The second friction members 13 are attached to the two plates 31 of the intermediate plate 3, respectively. The second friction member 13 are intervenient between the intermediate plate 3 and the driven plate 4 in the axial directions. The second friction members 13 generate a frictional force with the driven plate 4.

The second leaf spring 14 is intervenient between the second friction member 13 and the plate 31 of the intermediate plate 3. The second leaf spring 14 pushes the second friction member 13 toward the driven plate 4. The second leaf spring 14 increases the frictional force occurring between the second friction member 13 and the driven plate 4.

Figure 6:
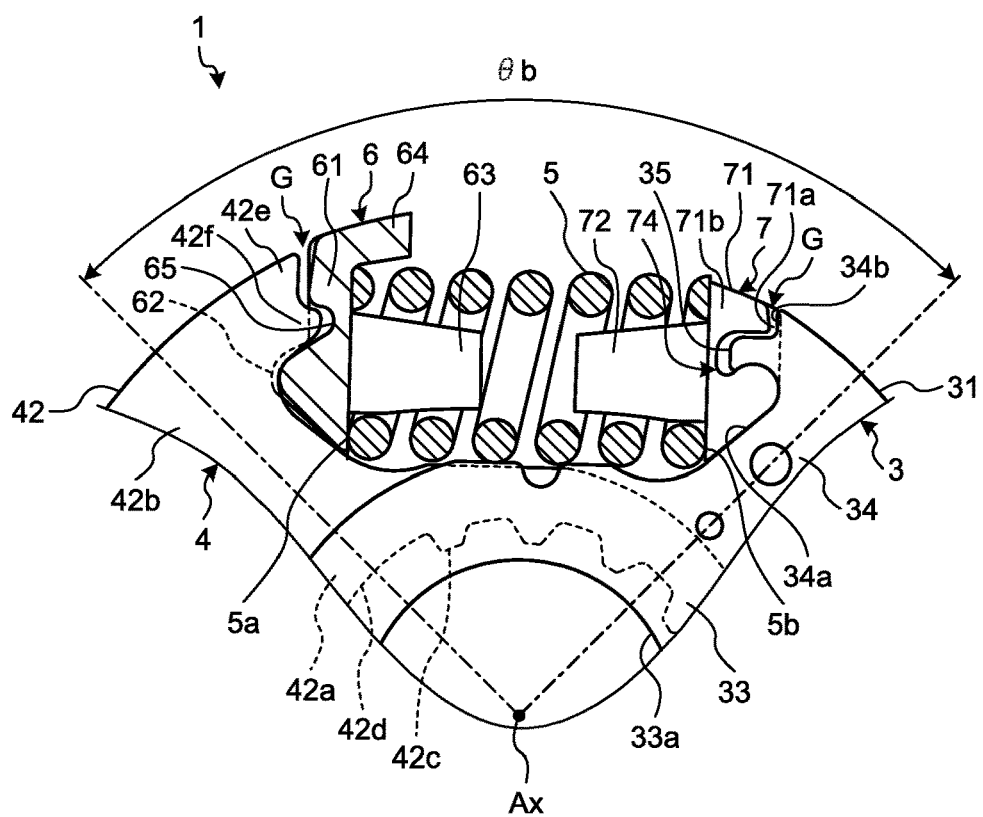
FIG. 6 is an elevational view of a part of the exemplary damper device of the first embodiment.
Figure 7:
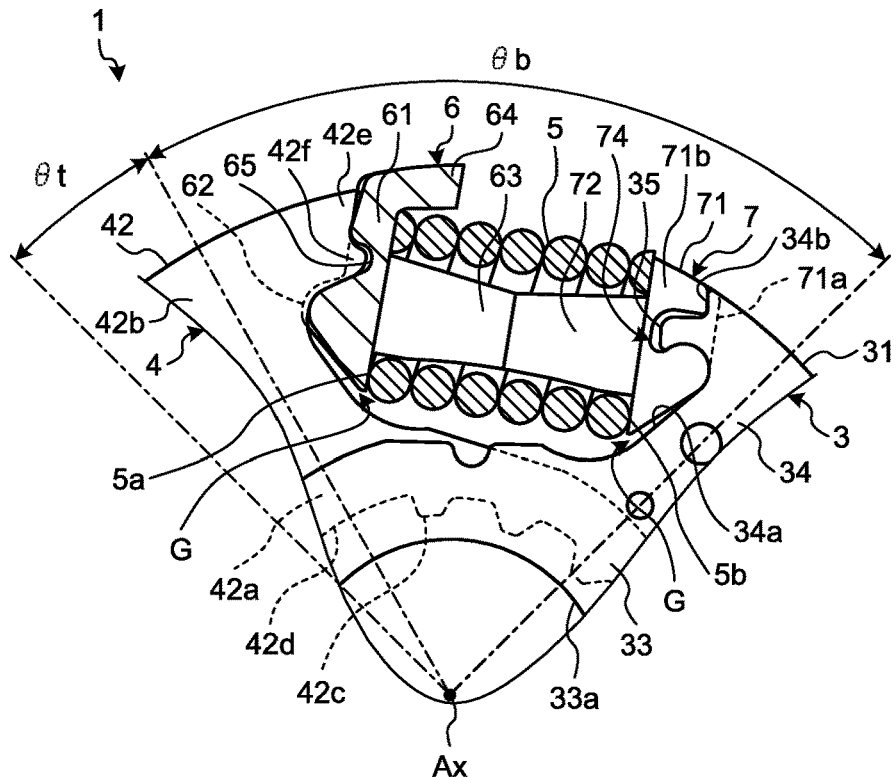
FIG. 7 is an elevational view of a part of the exemplary damper device of the first embodiment when the intermediate plate and a driven plate relatively rotate.

FIG. 6 is an elevational view of a part of the exemplary damper device 1 of the first embodiment. FIG. 7 is an elevational view of the part of the exemplary damper device 1 of the first embodiment when the intermediate plate 3 and the driven plate 4 relatively rotate.

As illustrated in FIG. 6 and FIG. 7, in response to torque acting on the damper device 1, the drive plate 2, the intermediate plate 3, and the driven plate 4 relatively rotate about the axis Ax. The torque acting on the damper device 1 causes a decrease in an angle θb between the intermediate plate 3 and the driven plate 4, causing a torsional angle θt in FIG. 7, for example.

As the torque increases, the angle θb between the arm 34 of the plate 31 of the intermediate plate 3 and the arm 42b of the outer hub 42 of the driven plate 4 decreases. As the torque further increases, the angle between the first frame 22c of the disc plate 22 of the drive plate 2 and the arm 34 of the plate 31 of the intermediate plate 3 also decreases.

As illustrated in FIG. 7, when the angle θb between the intermediate plate 3 and the driven plate 4 decreases to a certain angle, the convex 63 of the first sheet 6 comes into contact with the convex 72 of the second sheet 7. The contact between the convex 63 of the first sheet 6 and the convex 72 of the second sheet 7 serves to restrict the angle θb between the intermediate plate 3 and the driven plate 4 from further decreasing. In other words, the first and second sheets 6 and 7 contact with each other to restrict the torsion spring 5 from further contracting.

When the angle between the drive plate 2 and the intermediate plate 3 decreases to a certain angle, the convex 63 of the first sheet 6 comes into contact with the convex 72 of the second sheet 7. The contact between the convex 63 of the first sheet 6 and the convex 72 of the second sheet 7 works to restrict the angle between the drive plate 2 and the intermediate plate 3 from further decreasing. In other words, the first and second sheets 6 and 7 contact with each other to restrict the torsion spring 5 from further contracting.

The torsion springs 5, while restricted from contracting, do not damp rotational fluctuations of the engine, and the drive plate 2, the intermediate plate 3, and the driven plate 4 rotate together. The first and second sheets 6 and 7 contact with each other to inhibit the torsion springs 5 from being excessively compressed to a contact limit.

During the rotation of the intermediate plate 3 about the axis Ax, the distal end part of the arm 34 moves a longer distance than the basal end part (intermediate part 33 side) of the arm 34 does. Consequently, during no rotation of the second sheet 7, the torsion spring 5 exerts larger contraction and load from the radially outside part than from the radially inside part.

As described above, each torsion spring 5 exerts different contractions and loads in the radial directions, therefore, the torsion spring 5 elastically pushes the second sheet 7 so as to make contractions and loads more uniform in the radial directions. The radially outside part of the torsion spring 5, which exerts larger contraction and load, pushes the second sheet 7 with a greater reactive force, for example. The radially inside part of the torsion spring 5, which exerts smaller contraction and load, pushes the second sheet 7 with a smaller reactive force.

By the difference in the reactive force of the torsion spring 5 in the radial directions, the second sheet 7 is rotated, making the radial contraction of the torsion spring 5 more uniform. The second sheet 7 rotates such that the second contact edge 71bb approaches the second side edge 34b, for example.

Similarly, during the rotation of the drive plate 2 and the driven plate 4 about the axis Ax, the radial outside parts of the first frame 22c and the arm 42b move a longer distance than the radially inside parts thereof. Consequently, during no rotation of the first sheet 6, the torsion spring 5 exerts larger contraction and load from the radially outside part than from the radially inside part.

As described above, each torsion spring 5 exerts different contractions and loads in the radial directions, therefore, the torsion spring 5 elastically pushes the first sheet 6 so as to make contractions and loads more uniform in the radial directions. The radially outside part of the torsion spring 5, which exerts larger contraction and load, pushes the first sheet 6 with a greater reactive force, for example. The radially inside part of the torsion spring 5, which exerts smaller contraction and load, pushes the first sheet 6 with a smaller reactive force. By the difference in the reactive force of the torsion spring 5 in the radial directions, the first sheet 6 is rotated, making the radial contraction and load of the torsion spring 5 more uniform.

The damper device 1 rotates about the axis Ax by torque transmitted from the crankshaft. By this rotation, a centrifugal force acts on the torsion spring 5, the first sheet 6, and the second sheet 7.

In response to the centrifugal force, the second sheet 7 is to move radially outward. However, the projection 35 of the intermediate plate 3 supports the second sheet 7 to restrict the second sheet 7 from moving radially outward.

Moreover, in response to the centrifugal force, the second sheet 7 supported by the projection 35 is to rotate away from the axis Ax about a contact point between the projection 35 and the second sheet 7 as a fulcrum point, for example. However, the hook 35b of the projection 35 in FIG. 5 supports the engaging part 71be of the second sheet 7 to restrict the second sheet 7 from rotating away from the axis Ax.

The intermediate plate 3 supports the second sheet 7 by the contact point between the hook 35b and the engaging part 71be and the contact point between the second side edge 34b and the second contact edge 71bb, for example. Thereby, the intermediate plate 3 restricts the second sheet 7 from rotating away from the axis Ax.

As described above, the second sheet 7 is restricted from moving radially outward and rotating away from the axis Ax, so that the second sheet 7 is maintained in the supported state by the projection 35 of the intermediate plate 3 irrespective of receipt of a centrifugal force. This can prevent the second sheet 7 and the torsion spring 5 from being detached from the intermediate plate 3.

In the damper device 1 according to the first embodiment described above, the projection 35 of the intermediate plate 3 serves to rotatably support the second sheet 7 in the plane orthogonal to the axis Ax and restrict the second sheet 7 from separating from the intermediate plate 3 in the circumferential directions. Because of this, along with the rotation of the driven plate 4 toward the intermediate plate 3, the second sheet 7 can rotate such that the radially outside part and the radially inside part of the first torsion spring 51 can be substantially uniform in terms of load and length. This can reduce degradation in damping performance and strength, which would otherwise occur due to the non-uniform length and load of the first torsion spring 51. Further, irrespective of a centrifugal force acting on the second sheet 7, the projection 35 works to restrict the second sheet 7 from rotating beyond a certain angle and from separating from the intermediate plate 3 in the circumferential directions. That is to say, the projection 35 restricts the second sheet 7 from rotating at a fixed position and from rotating while circumventing the projection 35 in the circumferential directions, thereby inhibiting the second sheet 7 and the first torsion spring 51 from being detached from the intermediate plate 3. This can eliminate the necessity for adding, on the outer circumferential side of the first torsional spring 51, a member that restricts the first torsional spring 51 from moving radially outward and/or for downsizing the first torsional spring 51, which makes it possible to place the first torsional spring 51 further radially outside. By being placed further radially outside, the first torsional spring 51 is prevented from lowering in damping performance (torsional characteristics) and strength, and the damper device 1 is inhibited from increasing in size.

The projection 35 includes the hook 35b that comes into contact with the second sheet 7 which is to move away from the intermediate plate 3 in the circumferential directions. Thereby, the second sheet 7, which is to rotate, circumventing the projection 35 in the circumferential directions, is caught by the hook 35b, to further inhibit the second sheet 7 and the first torsional spring 51 from being detached from the intermediate plate 3.

The projection 35 includes the hook 35b protruding toward the axis Ax in the radial directions, and the second sheet 7 includes the engaging part 71be located between the intermediate plate 3 and the hook 35b in the circumferential directions. Thereby, the engaging part 71be of the second sheet 7, which is to rotate away from the axis Ax, is caught by the hook 35b, further inhibiting the second sheet 7 and the first torsional spring 51 from being detached from the intermediate plate 3.

Second Embodiment

Figure 8:
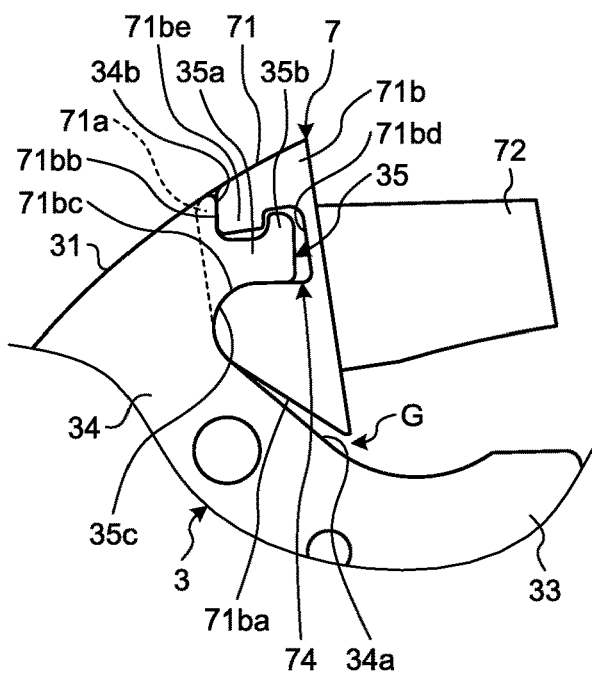
FIG. 8 is an elevational view of an example of a part of the intermediate plate and the second sheet according to a second embodiment.

The following describes a second embodiment with reference to FIG. 8. In the following description of the embodiment, elements having functions same or similar as the above-described elements may be denoted by the same symbols as the above-described elements, and descriptions thereof may be omitted. Two or more elements denoted by the same symbol do not necessarily have common functions and properties and may have different functions and properties according to the respective embodiment.

FIG. 8 is an elevational view of an example of a part of the intermediate plate 3 and the second sheet 7 according to the second embodiment. As illustrated in FIG. 8, the hook 35b of the second embodiment protrudes from the tip of the protruding part 35a toward the opposite side of the axis Ax in the radial directions. In the second embodiment, the curved edge 35c is located between the first side edge 34a and the tip of the protruding part 35a.

In the second embodiment, the engaging part 71be of the second sheet 7 is defined by the second contact edge 71bb and the second inner edge 71bd. The engaging part 71be is located between the arm 34 and the hook 35b in the circumferential directions.

In the damper device 1 of the second embodiment described above, the projection 35 also includes the hook 35b that comes into contact with the second sheet 7 when the second sheet 7 is to move away from the intermediate plate 3 in the circumferential directions, as with the first embodiment. Thereby, the second sheet 7, which is to rotate, circumventing the projection 35 in the circumferential directions, is caught by the hook 35b, and thus the second sheet 7 and the first torsional spring 51 are further inhibited from being detached from the intermediate plate 3.

The embodiments of the present invention have been exemplified; the embodiments and modifications are merely exemplary and not intended to limit the scope of the invention. The embodiments and modifications can be implemented in other various forms; various omissions, replacements, combinations, and modifications can be made to the extent without departing from the gist of the invention. The elements and the shapes in the embodiments and modifications can be partially interchanged for implementation.

The invention claimed is:

1. A damper device comprising:
a first rotational element rotatable about a rotational center;
a second rotational element rotatable about the rotational center;
a third rotational element rotatable about the rotational center;
a first elastic element that is located between the first rotational element and the third rotational element and is elastically compressed by relative rotation of the first rotational element with respect to the third rotational element in one of rotational directions;
a second elastic element that is located between the third rotational element and the second rotational element and is elastically compressed by relative rotation of the third rotational element with respect to the second rotational element in the one of the rotational directions;
a support member that is intervenient between the third rotational element and the first elastic element, to support the first elastic element; and
a restrictor provided with the third rotational element, to:
rotatably support the support member in a plane orthogonal to the rotational center,
restrict the support member from rotating beyond a certain angle, and
restrict the support member from moving away from the third rotational element in the rotational directions, wherein
the restrictor includes:
a protrusion that protrudes from the third rotational element in a direction crossing radial directions, as viewed in axial directions, and
a hook that protrudes from the protrusion away from the third rotational element in the rotational directions and comes into contact with the support member which is to move away from the third rotational element in the rotational directions,
the third rotational element comprises an arm extending in the radial direction,
the restrictor protrudes from an edge of the arm in the rotational direction,
in a first width direction orthogonal to a direction in which the restrictor protrudes from the arm, the restrictor has a longer length at a distal end than a part closer to the arm than the distal end,
the support member is provided with a concave opening toward the third rotational element in the rotational directions,
the restrictor is contained in the concave, and
the restrictor includes an arc-shaped edge recessed outward in the radial directions.

2. The damper device according to claim 1, wherein the hook protrudes from the protrusion toward the rotational center in the radial directions, and
the support member comprises an engaging part located between the third rotational element and the hook in the rotational directions.

3. The damper device according to claim 2, wherein the hook extends toward the rotational center from a basal end to a distal end.

4. The damper device according to claim 1, wherein the support member is provided with:
a first contact edge facing the third rotational element,
a second contact edge facing the third rotational element,
an arc-shaped first inner edge that is connected to the first contact edge and contacts with the edge of the restrictor, and
a second inner edge that connects the first inner edge and the second contact edge.

5. The damper device according to claim 4, wherein the first inner edge and the second inner edge define at least part of the concave, and in a second width direction orthogonal to a direction in which the concave extends, the concave has a longer length at a distal end than at a part closer to the first contact edge and the second contact edge than the distal end.

* * * * *